(12) United States Patent
Joh et al.

(10) Patent No.: US 8,776,707 B2
(45) Date of Patent: Jul. 15, 2014

(54) APPARATUS FOR FIXING AN INSULATION PANEL OF A CARGO AND INSULATION PANEL THEREOF

(71) Applicants: Ki-Hun Joh, Geoje-Si (KR); Sang-Eon Chun, Geoje-Si (KR); Chang-Seon Bang, Geoje-Si (KR); Dai-Gil Lee, Youseong-gu (KR); Byung-Chul Kim, Yeonje-gu (KR); Bu-Gi Kim, Buk-gu (KR); Jin-Gyu Kim, Changwon-si (KR); Soon-Ho Yoon, Nam-gu (KR); Sang-Wook Park, Nam-gu (KR); Kwan-Ho Lee, Yuseong-gu (KR); Seong-Su Kim, Geoje-si (KR); Byoung-Jung Kim, Sunchang-gun (KR); Po-Chul Kim, Cheongdo-gun (KR); Ha-Na Yu, Mungyeong-si (KR); Min-Woo Lim, Mokpo-si (KR); In-Uk Hwang, Ojeong-gu (KR)

(72) Inventors: Ki-Hun Joh, Geoje-Si (KR); Sang-Eon Chun, Geoje-Si (KR); Chang-Seon Bang, Geoje-Si (KR); Dai-Gil Lee, Youseong-gu (KR); Byung-Chul Kim, Yeonje-gu (KR); Bu-Gi Kim, Buk-gu (KR); Jin-Gyu Kim, Changwon-si (KR); Soon-Ho Yoon, Nam-gu (KR); Sang-Wook Park, Nam-gu (KR); Kwan-Ho Lee, Yuseong-gu (KR); Seong-Su Kim, Geoje-si (KR); Byoung-Jung Kim, Sunchang-gun (KR); Po-Chul Kim, Cheongdo-gun (KR); Ha-Na Yu, Mungyeong-si (KR); Min-Woo Lim, Mokpo-si (KR); In-Uk Hwang, Ojeong-gu (KR)

(73) Assignee: Samsung Heavy Ind. Co., Ltd., Seoul (KR)

( * ) Notice: Subject to any disclaimer, the term of this patent is extended or adjusted under 35 U.S.C. 154(b) by 0 days.

(21) Appl. No.: 13/737,481

(22) Filed: Jan. 9, 2013

(65) Prior Publication Data

US 2013/0121758 A1    May 16, 2013

Related U.S. Application Data

(60) Division of application No. 13/456,003, filed on Apr. 25, 2012, now abandoned, which is a division of application No. 12/917,275, filed on Nov. 1, 2010, now abandoned, which is a continuation of application No. PCT/KR2009/002305, filed on Apr. 30, 2009.

(30) Foreign Application Priority Data

| May 2, 2008 | (KR) | ........................ 10-2008-0041491 |
| Aug. 12, 2008 | (KR) | ........................ 10-2008-0078903 |
| Apr. 29, 2009 | (KR) | ........................ 10-2009-0037843 |

(51) Int. Cl.
*B63B 25/08* (2006.01)

(52) U.S. Cl.
USPC ............... 114/75; 114/76; 403/336; 403/337; 248/220.21; 248/223.41

(58) Field of Classification Search
USPC .......... 403/167, 168, 187, 188, 256, 305, 306, 403/309, 336, 337, 408.1; 220/560.11, 220/560.12, 560.04, 586, 592.26; 248/200, 248/220.21, 223.41, 300; 114/72, 75, 76
See application file for complete search history.

(56) References Cited

U.S. PATENT DOCUMENTS

| 2,005,380 A | 6/1935 | Marsh et al. |
| 3,339,780 A | 9/1967 | Forman et al. |
| 3,341,050 A | 9/1967 | Forman et al. |
| 3,367,492 A | 2/1968 | Pratt et al. |
| 3,811,593 A | 5/1974 | Bridges et al. |
| 3,896,961 A | 7/1975 | Guilhem et al. |
| 4,155,482 A | 5/1979 | Swaney |
| 4,170,952 A | 10/1979 | McCown |
| 4,290,710 A | 9/1981 | Waller |
| 5,117,987 A | 6/1992 | Lombardo |
| 5,182,996 A | 2/1993 | Gutgsell |
| 5,251,996 A | 10/1993 | Hiller et al. |

| | | | |
|---|---|---|---|
| 5,586,513 | A | 12/1996 | Jean et al. |
| 5,869,798 | A | 2/1999 | Ryu et al. |
| 6,035,795 | A | 3/2000 | Dhellemmes et al. |
| 6,479,746 | B2 | 11/2002 | Hussaini |
| 6,691,964 | B1 | 2/2004 | Schaefer |
| 7,451,576 | B2 | 11/2008 | Barone |
| 7,610,731 | B1 | 11/2009 | Collison |
| 7,717,289 | B2 | 5/2010 | Yang et al. |
| 7,819,273 | B2 | 10/2010 | Yang et al. |

FOREIGN PATENT DOCUMENTS

| | | |
|---|---|---|
| CN | 002752845 Y | 1/2006 |
| JP | 1977-57512 | 5/1977 |
| JP | 57-027600 U | 2/1982 |
| JP | 1983-4687 | 1/1983 |
| JP | 1993-310289 | 11/1993 |
| JP | 1996-14360 | 2/1996 |
| JP | 2000-79987 | 3/2000 |
| JP | 200 1-63681 | 5/2001 |
| JP | 2001-122386 | 5/2001 |
| KR | 10-2000-0011769 A | 2/2000 |

OTHER PUBLICATIONS

International Search Report and Written Opinion for co-pending PCT Application No. PCT/KR2009/002305 dated Nov. 2, 2010, 9 pgs.

Partial English translation of the Written Opinion for co-pending PCT Application No. PCT/KR2009/002305 dated Dec. 4, 2009, 2 pgs.

Japanese Office Action on Japanese Application No. 2011-507356 dated May 15, 2012.

Chinese Office Action for corresponding CN Application No. 2009801165.3, dated Dec. 19, 2012, pp. 1-8.

Chinese Office Action on Chinese Application No. 200980116565.3, dated Oct. 15, 2013, pp. 1-6.

*Primary Examiner* — Gregory Binda
*Assistant Examiner* — Nahid Amiri
(74) *Attorney, Agent, or Firm* — Brinks Gilson & Lione

(57) ABSTRACT

A fixing apparatus for fixing a cargo insulation panel to a hull is provided. The fixing apparatus includes a fixing plate adhered to one face of the insulation panel, a plurality of fixing brackets protruded to the outside of the fixing plate, protruded portions of the fixing brackets being fixed by stud bolts arranged on the hull, and a coupling device configured to couple the fixing brackets to the fixing plate.

6 Claims, 18 Drawing Sheets

APPARATUS FOR FIXING AN INSULATION PANEL OF A CARGO AND INSULATION PANEL THEREOF

CROSS-REFERENCE TO RELATED APPLICATIONS

This application is a divisional of U.S. application Ser. No. 13/456,003, filed on Apr. 25, 2012, which is a divisional of U.S. application Ser. No. 12/917,275, filed on Nov. 1, 2010, which is a continuation of and claims the benefit of priority under 35 U.S.C. §§120, 365, and 371 to Patent Cooperation Treaty Patent Application No. PCT/KR2009/002305, filed on Apr. 30, 2009, which claims the benefit of priority to Korean Application Nos. 10-2008-0041491, filed May 2, 2008, 10-2008-0078903, filed Aug. 12, 2008 and 10-2009-0037843, filed Apr. 29, 2009. The disclosures of the above applications are incorporated herein by reference in their entireties.

TECHNICAL FIELD

The present invention is related to a fixing apparatus of a cargo insulation panel and an insulation panel using the fixing apparatus.

BACKGROUND

Liquefied natural gas ("LNG") generally refers to colorless, transparent cryogenic liquid converted from natural gas (predominantly methane) that is cooled to approximately −163° C. and condensed to about $\frac{1}{600}^{th}$ of the original volume.

As LNG emerges as an energy source, efficient transportation means have been sought in order to transport LNG from a supply site to a demand site in a large scale so as to utilize LNG as energy. Resulted in a part of this effort are LNG carriers, which can transport a large quantity of LNG by sea.

LNG carriers need to be furnished with a cargo that can keep and store cryogenically liquefied LNG, but such carriers require intricate and difficult conditions.

That is, since LNG has vapor pressure that is higher than atmospheric pressure and boiling point of approximately −163° C., the cargo that stores LNG needs to be constructed with materials that can withstand a very low temperature, for example, aluminum steel, stainless steel and 33% nickel steel, and designed in a unique insulation structure that can withstand thermal stress and thermal contraction and can be protected from heat leakage, in order to keep and store LNG safely.

Described below with reference to the accompanying drawings is the insulation structure of a conventional LNG carrier cargo.

FIG. 1 is a sectional view illustrating a conventional insulation structure of an LNG carrier cargo. As illustrated, a bottom insulation panel 10 is adhered and fixed by way of a fixing plate 10a to an internal face of a hull 1 of an LNG carrier by epoxy mastic 13 and a stud bolt 14.

Here, interposed and adhered in between the bottom insulation panel 10 and a top insulation panel 20 is a rigid triplex 22. When the bottom insulation panel 10 is adhered to a cargo wall, the bottom insulation panel 10 is formed with a gap 40 so that a flat joint 18 made of a glass wool material can be inserted in the gap 40 formed between bottom insulation panels 10.

Then, a top bridge panel 28 is attached in between the top insulation panels 20 by adhering a supple triplex 26 over the rigid triplex 22, which is already attached, with epoxy glue 24 and then adhering the top bridge panel 28 over the supple triplex 26 with epoxy glue 24.

The top insulation panel 20 and an upper part of the top bridge panel 28 have a same planar surface, on which a corrugated membrane 30 is attached by way of an anchor strip 32 to complete the cargo wall.

Looking at how the internal face of the hull 1 and the bottom insulation panel 10 of an LNG carrier are assembled in further detail, the stud bolt 14 is adhered to an inner wall of the hull 1 by resistance welding, and a through-hole, through which the stud bolt 14 can be inserted, is pre-formed vertically in the bottom insulation panel 10.

Accordingly, assembly is completed by engaging a nut 14a with the stud bolt 14 and inserting a cylinder-shaped foam plug 15 in the hole formed in the bottom insulation panel 10.

As described above, in the conventional cargo insulation structure, the through-hole as shown in FIG. 1 or a through-cavity for performing the same function as the through-hole is vertically formed at a boundary of the insulation panel in order to fix the insulation panel to the hull by use of the stud bolt. In this case, discontinuity is formed in the insulation panel, inevitably lowering the airtightness of the sealing membrane and weakening the adhesive force to the supple triplex due to the reduction in the adhesive area of the upper surface.

Moreover, in case there is a crack in the epoxy glue for installing the supple triplex during the assembly of the insulation panel in the hull, the crack can be extended all the way to the through-hole or through-cavity for fastening the stud bolt, providing a path for gas leak that may adversely affect the hull.

SUMMARY

A fixing apparatus of a cargo insulation panel in accordance with the present invention can include: a fixing plate adhered to one face of the insulation panel; a plurality of fixing brackets protruded to the outside of the fixing plate, protruded portions of the fixing brackets fixed by stud bolts arranged on the hull; and a plurality of couplers configured to couple the fixing brackets to the fixing plate.

A guide groove can be formed in one face of the fixing plate, wherein the guide groove can guide a fixing bracket to be inserted and reciprocated from an inside to an outside. A stopping part can be formed at an end portion of the fixing bracket so that the fixing bracket is stopped when the fixing bracket moves toward the inside of the fixing plate. The plurality of fixing brackets can be formed along edges on both sides of the fixing plate, and the fixing brackets positioned to correspond to one another on two sides are aligned to miss one another. A supporting piece configured to tightly adhere the fixing bracket to the fixing plate by crossing the fixing bracket can be installed on the fixing plate.

A coupler can include one or more fastening members that are fastened to the fixing plate by penetrating the fixing bracket. A guide hole through which the fastening member penetrates can be formed in the fixing bracket in such a way that the guide hole is extended in a direction such that the fixing bracket reciprocates from the inside to the outside of the fixing plate, and a stopping groove by which a head of the fastening member is stopped can be formed on an inner perimeter of the guide hole. The coupler can also include a stopper supporting the fixing bracket by being fastened to the fixing plate so that the fixing bracket remains protruded from the fixing plate.

The fixing bracket can be inserted into a guide groove formed at an edge of the fixing plate and can be supported by the coupler so that the fixing bracket can reciprocate along the guide groove from the inside of the fixing plate to a predetermined position on the outside of the fixing plate. A fastening groove for fastening the stud bolt to the fixing bracket can be formed at a portion of the fixing bracket that is protruded from the fixing plate in such a way that one side of the fastening groove is open. The coupler can include: a supporting plate supporting one face of the fixing bracket; and a fastening member being fastened to the fixing plate by penetrating the supporting plate and a guide hole formed in the fixing bracket along a moving direction. A curb for stopping an end part of the fixing bracket protruded from the fixing plate can be formed on a side of the supporting plate where the fixing bracket makes contact. A pair of the couplers can be arranged on either side of the fixing bracket, and each supporting plate can be inserted in each insertion groove formed on either side of the fixing bracket.

The fixing apparatus can also include an elastic piece being coupled to one face of the fixing bracket in such a way that both ends of the elastic piece are protruded through both sides of the fixing bracket. A guide groove, in which the fixing bracket is inserted and which supports the fixing bracket to reciprocate from the inside to the outside of the fixing plate, can be formed at an edge of the fixing plate. A receiving groove, in which both end parts of the elastic piece and the coupler are received, can be formed on either side of the guide groove.

Once the fixing bracket is moved from the inside of the fixing plate to a predetermined position on the outside of the fixing plate, both end parts of the elastic piece can be inserted into the receiving groove so that the fixing bracket is moved to neither to the inside nor to the outside of the fixing plate. The length of the guide groove can be greater than the length of the fixing bracket in its reciprocating direction. A fastening groove for fastening the stud bolt to the fixing bracket can be formed in the fixing bracket at a portion of the fixing bracket protruded from the fixing plate.

The coupler can include: a supporting plate supporting one face of the fixing bracket and being received in the receiving groove; and a fastening member being fastened to the receiving groove by penetrating the supporting plate. An opening corresponding to the shape of the fastening groove can be formed at a portion of the supporting plate, the fixing plate and the insulation panel, respectively.

STS304L or SM45C of the Korean Industrial Standard can be used as a material for the fixing bracket.

An insulation panel of a cargo installed in a hull for storing a cryogenic fluid in accordance with the present invention can include: a fixing plate adhered to one face of the insulation panel; a plurality of fixing brackets protruded to the outside of the fixing plate, protruded portions of the fixing brackets fixed by stud bolts arranged on the hull; and a plurality of couplers configured to couple the fixing brackets to the fixing plate.

STS304L or SM45C of the Korean Industrial Standard can be used as a material for the fixing bracket.

DRAWINGS

Figure 16:
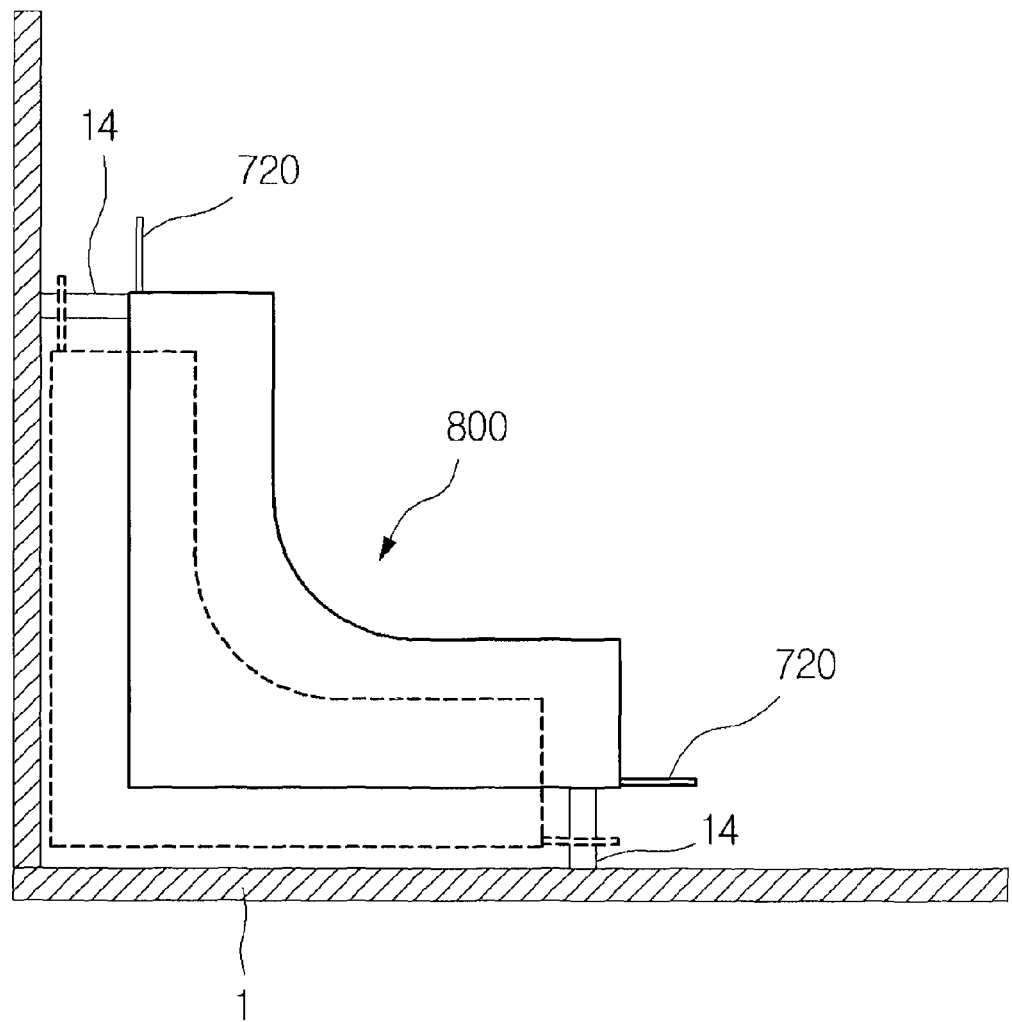
Figure 17:
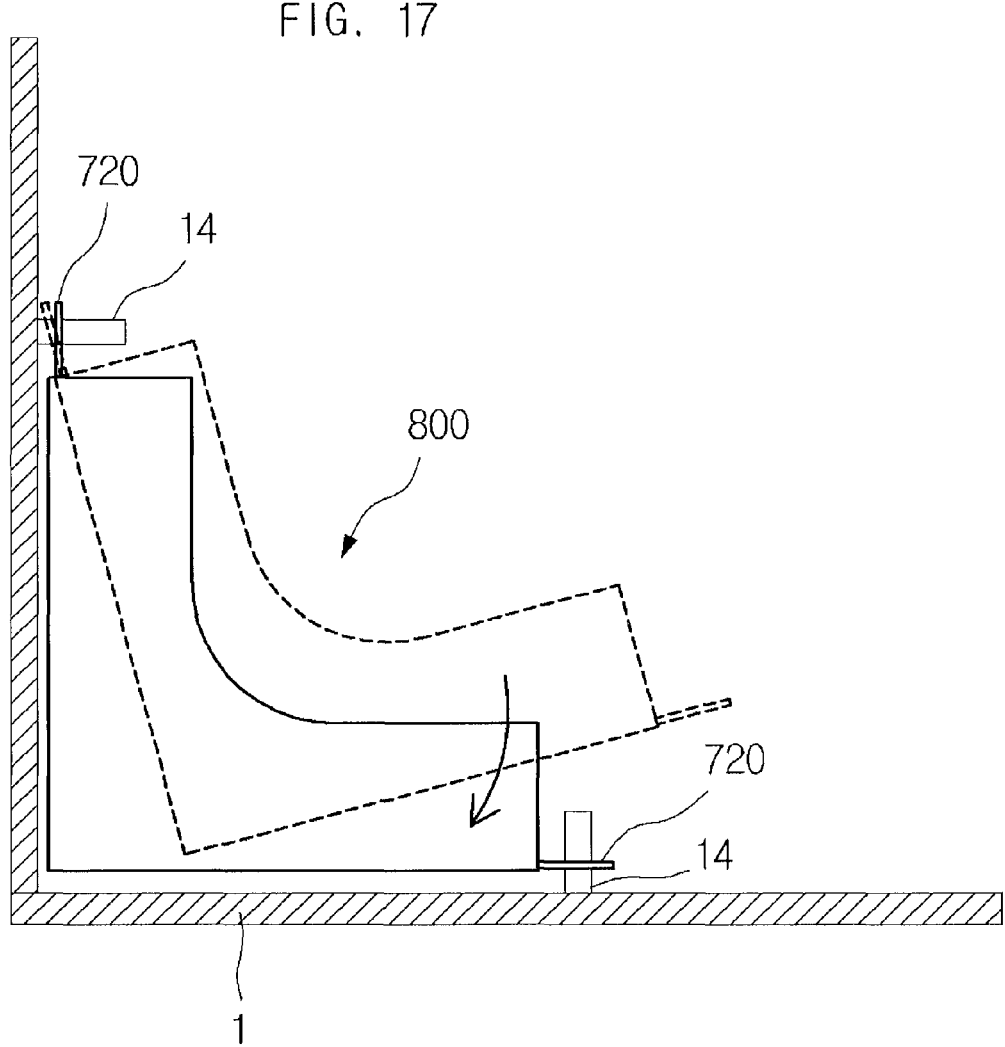
Figure 18:
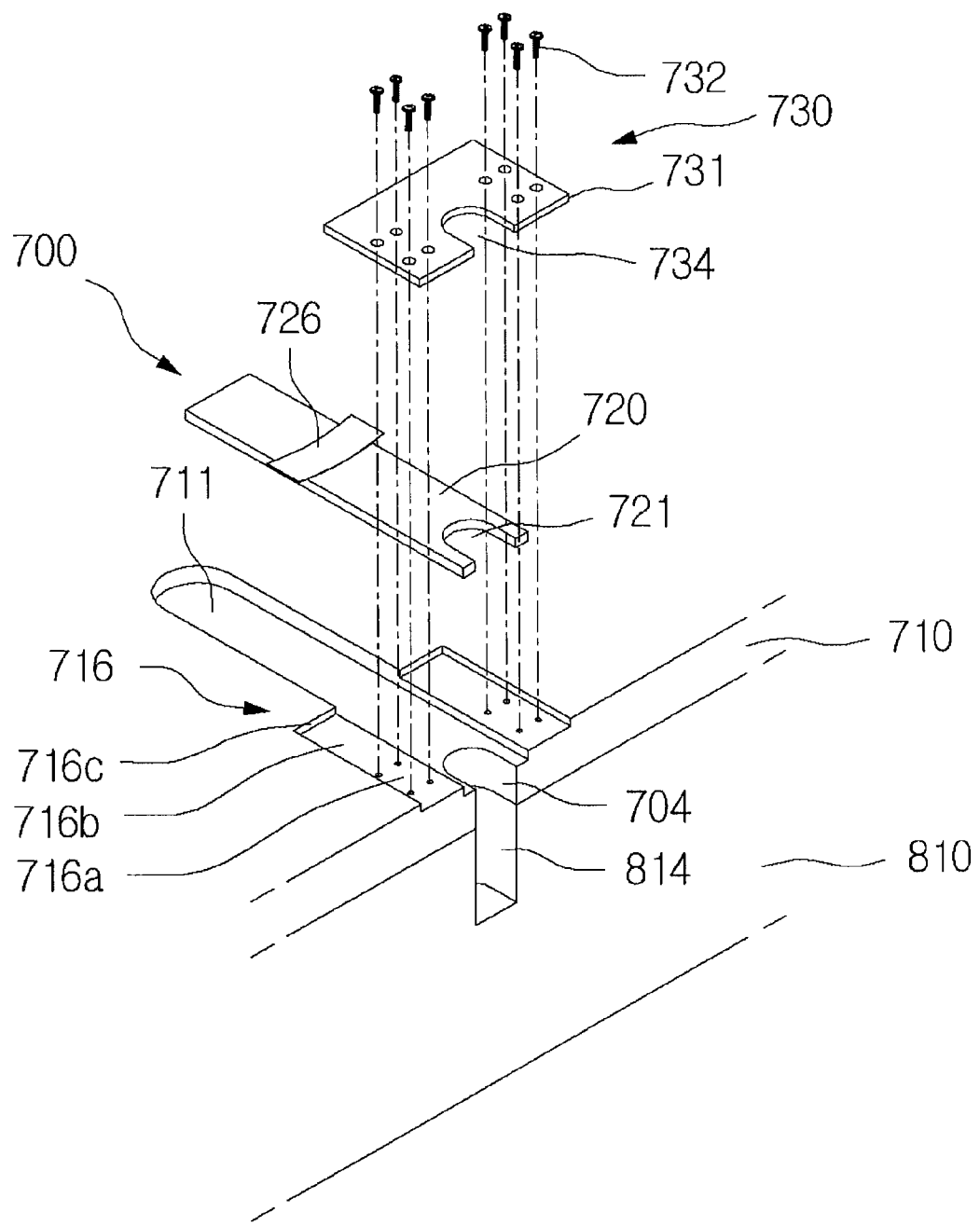

FIGS. 16 and 17 are sectional views for illustrating how a modified example of the fixing apparatus of the cargo insulation panel in accordance with the third embodiment of the present invention is applied in a corner insulation panel; and FIG. 18 is an exploded perspective view of a modified example of the fixing apparatus of the cargo insulation panel in accordance with the third embodiment of the present invention.

DETAILED DESCRIPTION

Hereinafter, some embodiments of the present invention will be described with reference to the accompanying drawings. In describing the present invention, when it is determined that detailed description of certain known relevant elements or functions would obscure the gist of the present invention, such description will be omitted.

Figure 1:
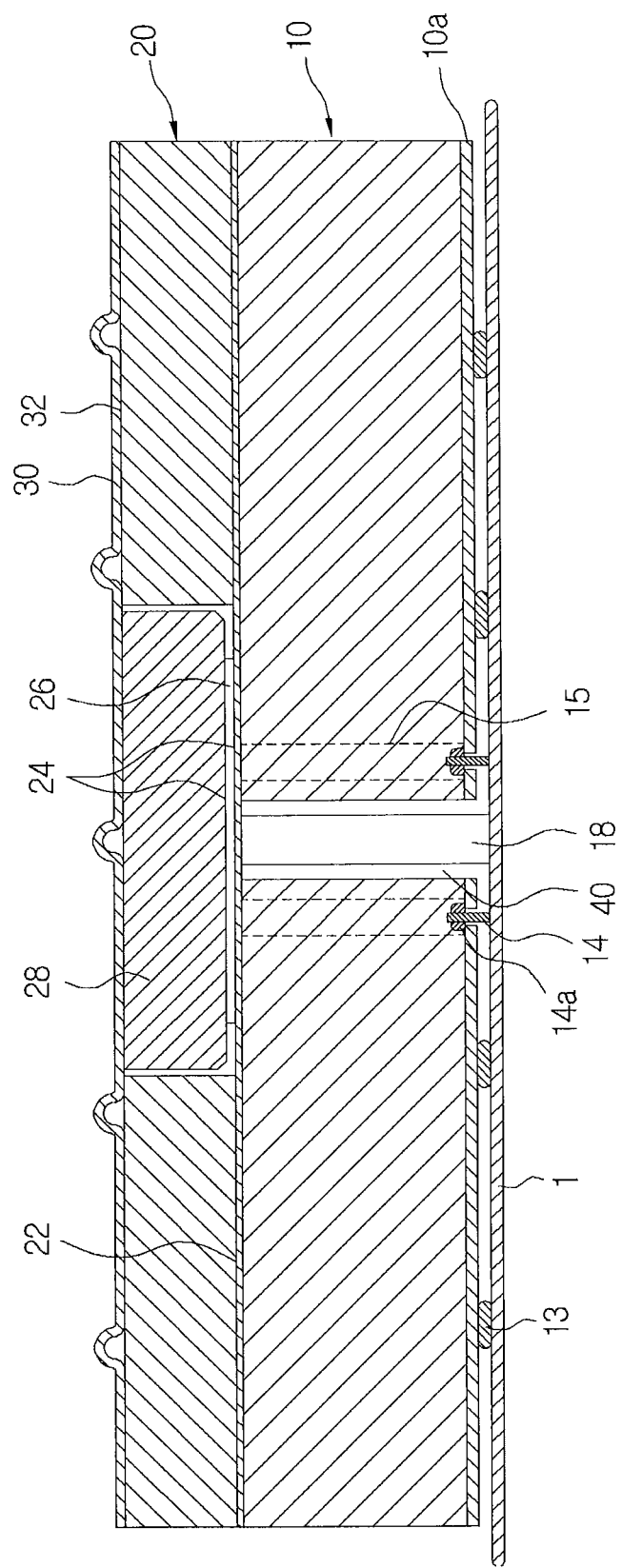
FIG. 1 is a sectional view illustrating an insulation structure of a cargo of an LNG carrier in accordance with the conventional art.
Figure 2:
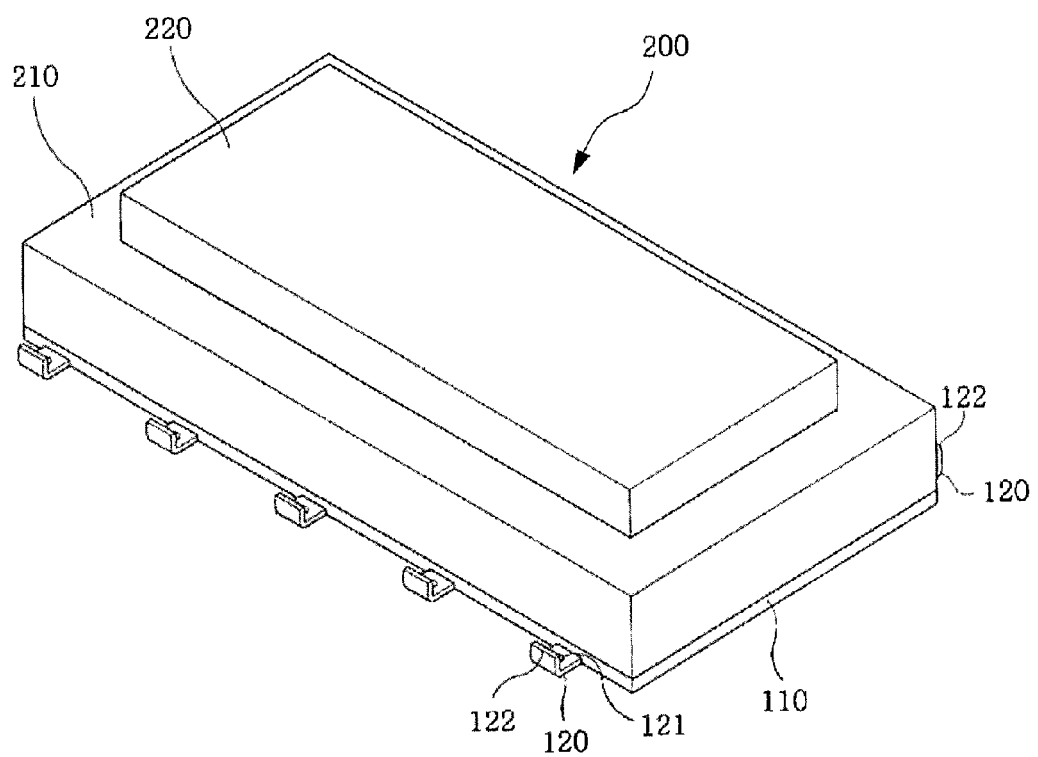
FIG. 2 is a perspective view of a cargo insulation panel in accordance with a first embodiment of the present invention.
Figure 3:
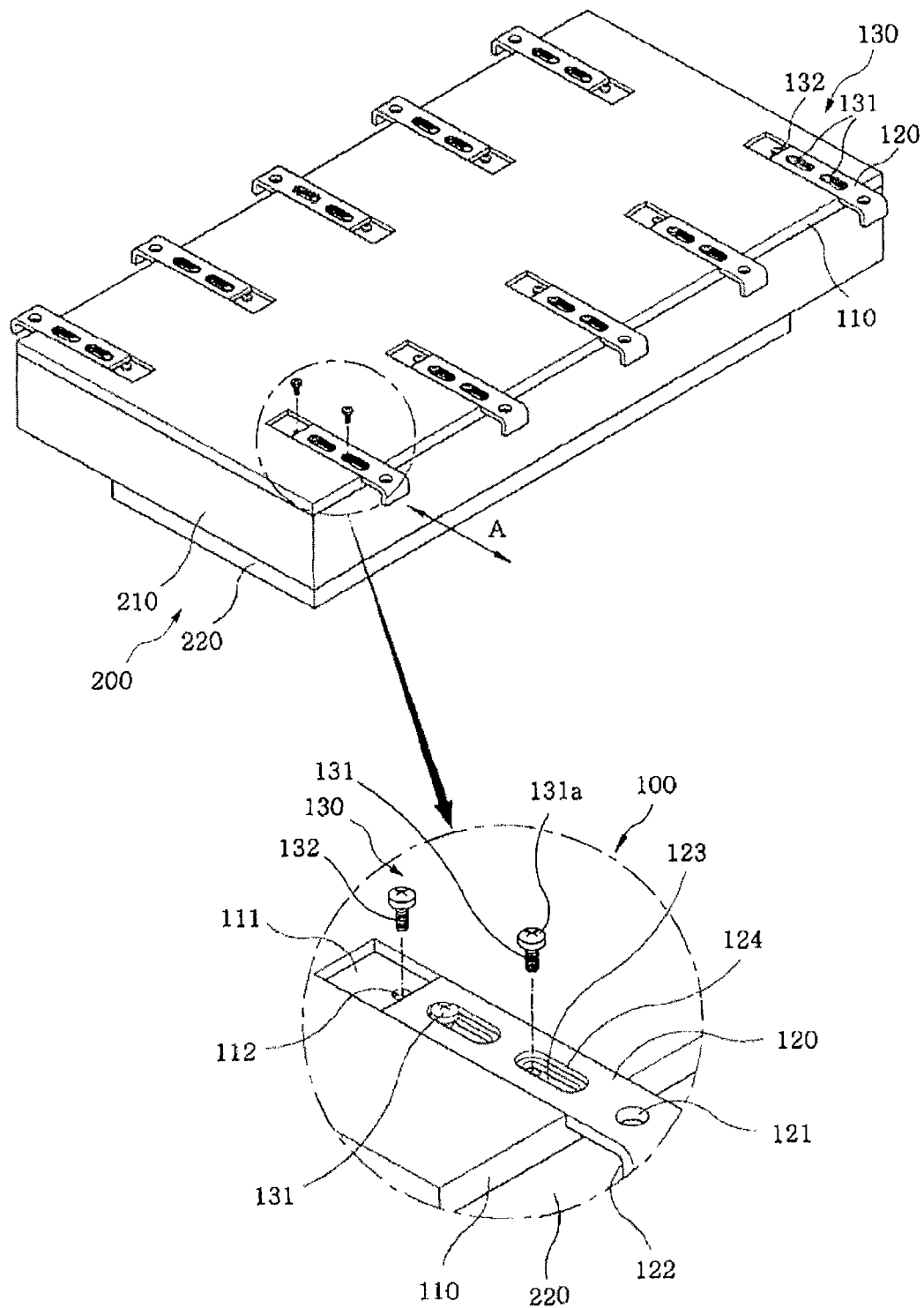
FIG. 3 is a perspective view seen from a lower side of the cargo insulation panel in accordance with the first embodiment of the present invention.

FIG. 2 is a perspective view of a cargo insulation panel in accordance with a first embodiment of the present invention, and FIG. 3 is a perspective view seen from a lower side of the cargo insulation panel in accordance with the first embodiment of the present invention. As illustrated, a cargo insulation panel 200 in accordance with the first embodiment of the present invention is installed in a hull in order to store a cryogenic fluid and has a cargo insulation panel fixing apparatus 100 in a face on one side.

The insulation panel 200 can be a single-layer panel or a multi-layer structure for better airtightness. In the present embodiment, the insulation panel 200 includes a bottom insulation panel 210 and a top insulation panel 220, which are adhered to each other through a rigid triplex. The cargo insulation panel fixing apparatus 100 is arranged in a face on one side of the bottom insulation panel 210.

The cargo insulation panel fixing apparatus 100 in accordance with the present embodiment includes a fixing plate 110, which is adhered to the insulation panel 200, more specifically to a lower face of the bottom insulation panel 210, a plurality of fixing brackets 120, which are protruded to the outside of the fixing plate 110 so as to be fixed by stud bolts 14 (shown in FIG. 5), and coupling means 130, which couple the fixing brackets 120 to the fixing plate 110.

Figure 5:
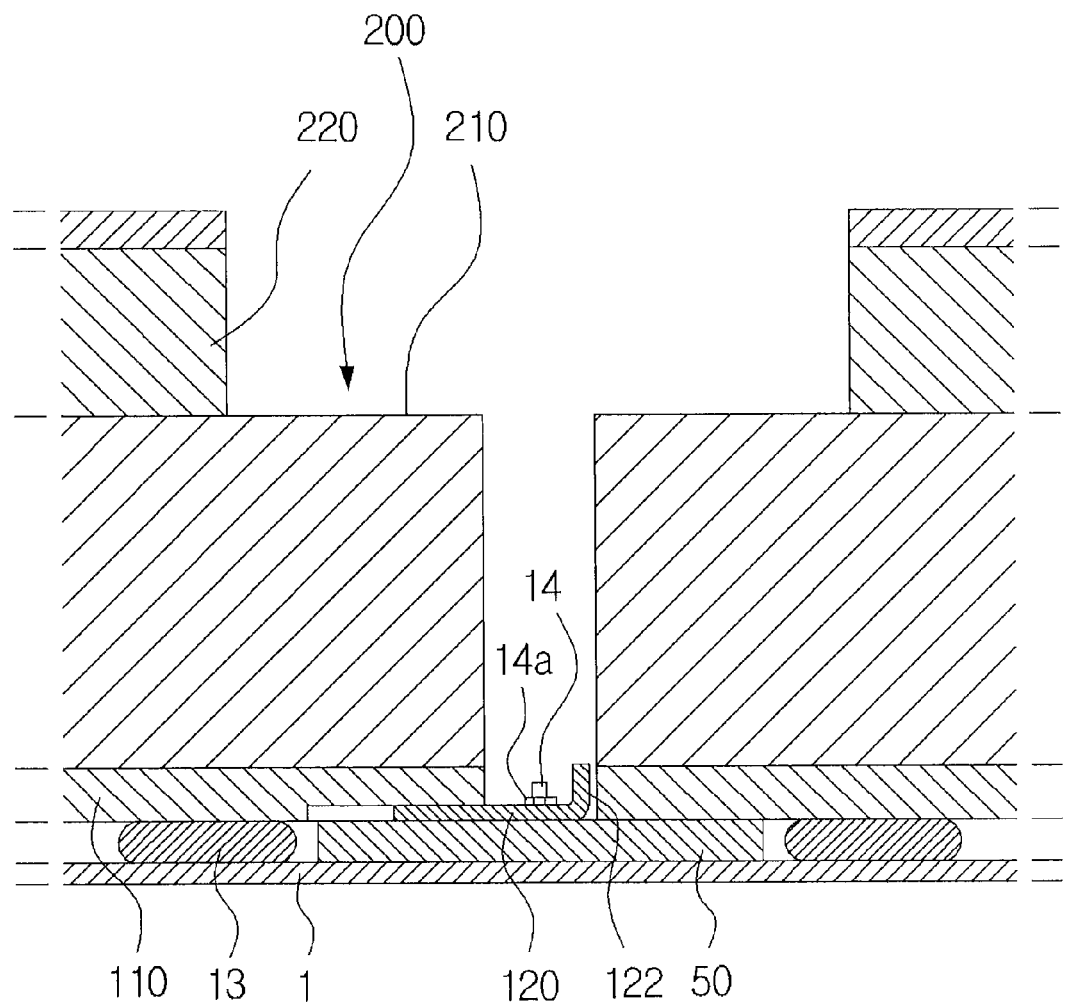
FIG. 5 is a sectional view of the installed cargo insulation panel in accordance with the first embodiment of the present invention.

The fixing plate 110 is adhered to the lower face of the bottom insulation panel 210 by use of an adhesive such as epoxy glue, reinforces the bottom insulation panel 210, and mediates the bottom insulation panel 210 to be fixed at an internal face of a hull 1 (see FIG. 5). Used for the fixing plate 110 can be, for example, plywood.

Figure 4:
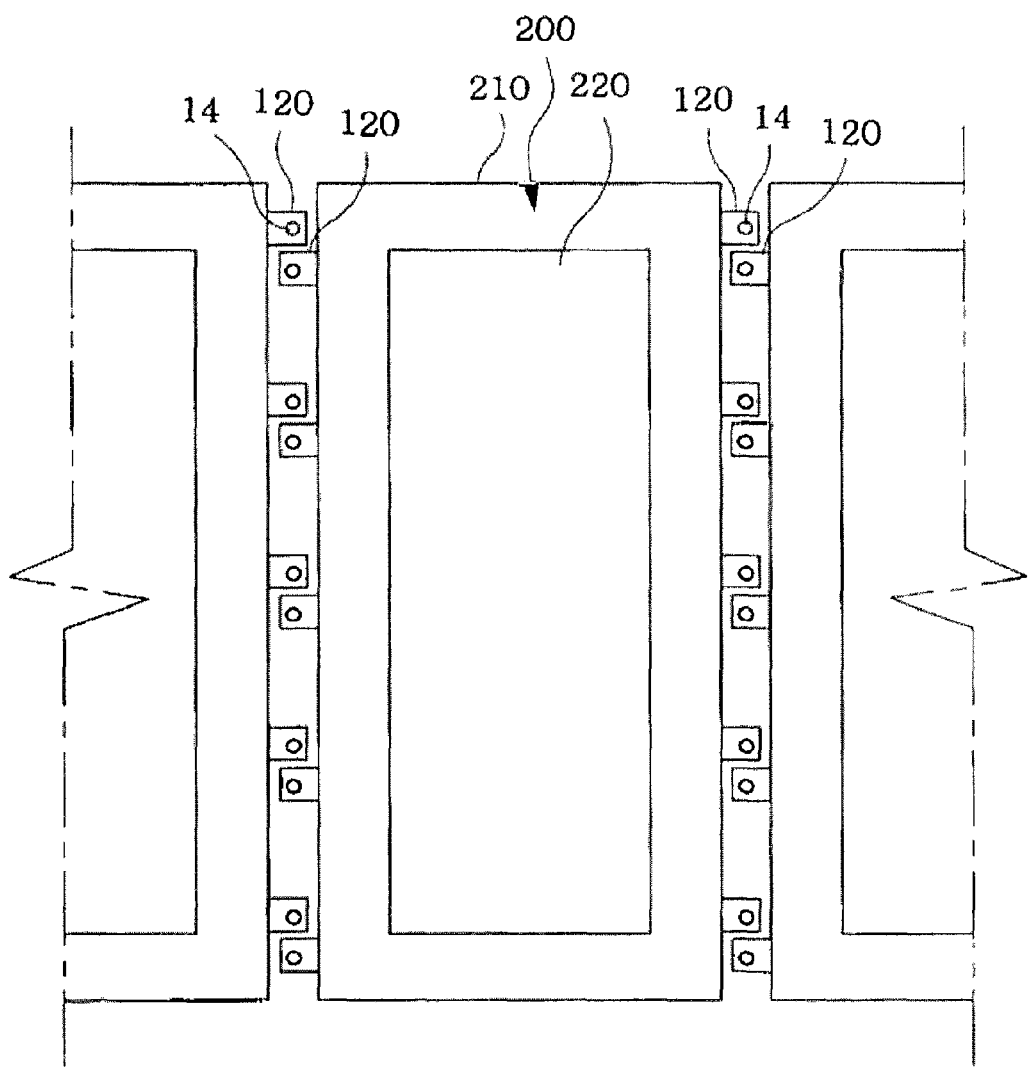
FIG. 4 is a top view of the installed cargo insulation panel in accordance with the first embodiment of the present invention.

The fixing brackets 120 are arranged at edges of the fixing plate 110. Preferably, a plurality of the fixing brackets 120 are arranged along the edges on both sides of the fixing plate 110. As shown in FIG. 4, the fixing brackets 120 positioned to correspond to one another on two sides are aligned to miss one another so as to narrow a gap between neighboring fixing plates 110.

The fixing plate 110 is formed with guide grooves 111 on one surface so as to guide the fixing brackets 120 to be inserted and reciprocated in and out.

The plurality of fixing brackets 120 are arranged to protrude toward the outside of the fixing plate 110, and the protruded portion is formed with a fastening hole 121 so as to be fixed by the stud bolt 14 (see FIG. 5) that is fixed to the hull 1 by electric welding. The fixing bracket 120 is inserted in the guide groove 111 of the fixing plate 110 and moves along the guide groove 111 so that the fixing bracket 120 can be inserted into or protruded from the fixing plate 110.

The fixing bracket 120 has a stopping part 122, which is formed by, for example, bending at its end portion so that the fixing bracket 120 can be easily withdrawn to the outside by having the fixing bracket 120 to be stopped when the fixing bracket 120 is moved toward the inside of the fixing plate 110.

The coupling means 130 are one or more fastening members 131, such as bolts, rivets, etc., fastened to the fixing plate 110 by penetrating guide holes 123 that are formed in the fixing bracket 120.

The guide hole 123 is extended in moving directions of the fixing bracket 120 so that the fixing bracket 120 can reciprocate inward and outward in the fixing plate 110. A stopping groove 124, by which a head 131a of the inserted fastening member 131 is stopped, is formed along an inner perimeter of the guide hole 123. The tightness between the fixing bracket 120 and the fixing plate 110 can be determined according to the fastening strength of the fastening member 131. Therefore, the fixing bracket 120 maintains its state of being coupled to the fixing plate 110 by the fastening member 131. Since the fixing bracket 120 can be reciprocated in the direction indicated by "A" in FIG. 3 by the guide hole 123, the fixing bracket 120 can be inserted to the inside of the fixing plate 110 in such a way that interference is minimized during the transportation, and can be protruded to the outside of the fixing plate 110 in such a way that the fixing bracket 120 can be fixed by the stud bolt 14 (shown in FIG. 5). Moreover, by having the head 131a of the fastening member 131 unprotruded by the stopping groove 124, interference with epoxy mastic 13 (shown in FIG. 5) can be prevented.

The number of guide holes 123 can be determined according to the number of fastening members 131, and in the case of the present embodiment, there are two guide holes 123.

The coupling means 130 can additionally have a stopper 132 that is fastened to the fixing plate 120 to support the fixing bracket 120 so that the fixing bracket 120 can remain protruded from the fixing plate 110.

Used for the stopper 132 can be, for example, a bolt that is screwed in a fastening groove 112 formed inside the guide groove 111 of the fixing plate 110. By supporting an end portion of the fixing bracket 120 that is protruded from the fixing plate 110, the stopper 132 can stop the fixing bracket 120 from being further inserted toward the inside of the fixing plate 110.

Figure 6:
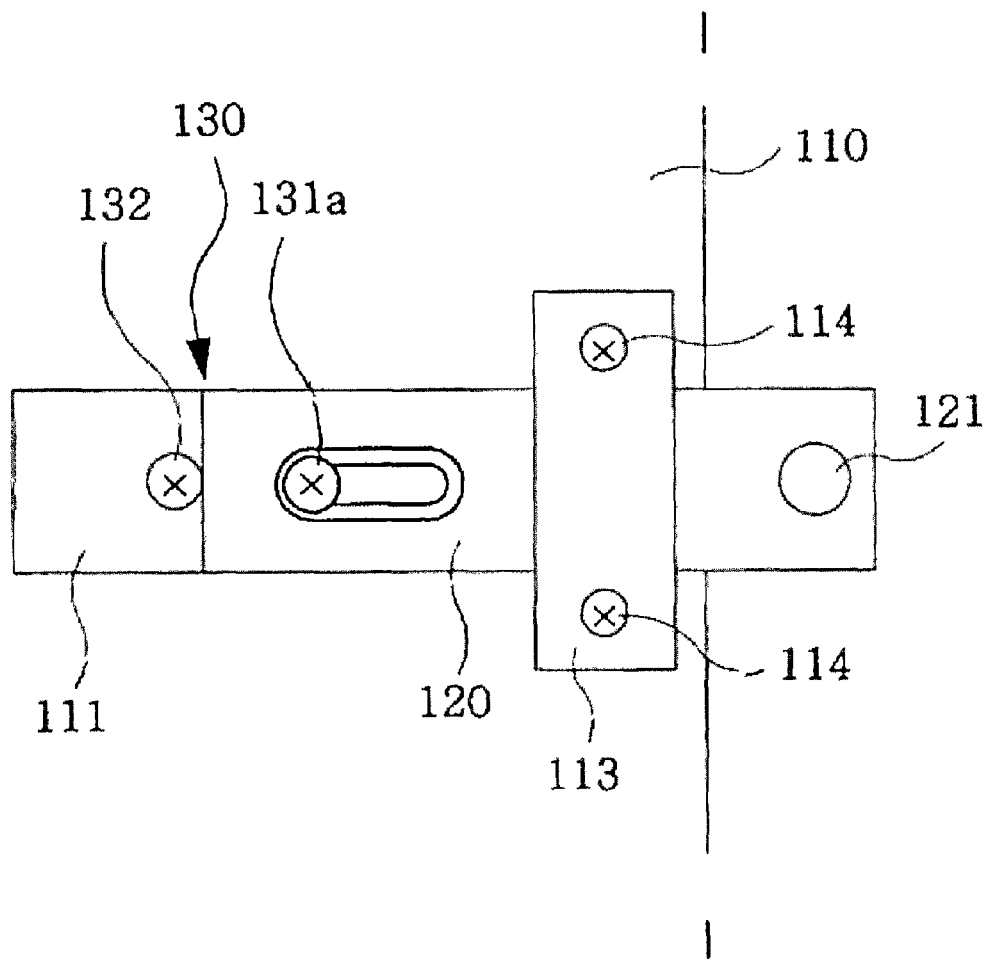
FIG. 6 is a bottom view of a supporting piece of a fixing apparatus of the cargo insulation panel in accordance with the first embodiment of the present invention.

Unlike the present embodiment and as illustrated in FIG. 6, the fixing plate 110 can be furnished with a supporting piece 113 that not only makes the fixing bracket 120 tightly adhere to the fixing plate 110 so that the fixing bracket 120 may not be broken away in the vertical direction but also disperses the load exerted on the fixing bracket 120.

Both ends of the supporting piece 113 are fixed to a lower face of the fixing plate 110 by a fixing member 114, such as a bolt or rivet, in such a way that the supporting piece 113 crosses the fixing bracket 120.

The cargo insulation panel fixing apparatus having the above structure in accordance with the first embodiment of the present invention and the insulation panel using the fixing apparatus function as follows.

The insulation panel 200 is transported with the fixing bracket 120 inserted in the guide groove 111 in order to prevent the interference that may be caused by the protrusion of the fixing bracket 120 during the transportation.

When fixing the insulation panel 200 on the hull 1 as illustrated in FIG. 5, the fixing plate 110 is placed over the epoxy mastic 13 while the fixing bracket 120 is protruded from the fixing plate 110, and the stud bolt 14 is inserted into the fastening hole 121 of the fixing bracket 120 to be fastened by the nut 14a. Then, separation of the fixing bracket 120 from the fixing plate 110 is restricted by the fastening member 131, and insertion of the fixing bracket 120 to the inside of the fixing plate 110 is restricted by the stopper 132. As a result, the fixing plate 110 is fixed to be properly adhered over the epoxy mastic 13 and can be installed over a level pad 50, which is installed on the internal face of the hull 1.

Moreover, as shown in FIG. 4, by aligning the fixing brackets 120 that are positioned in between the neighboring fixing plates 110 to miss one another so as not to interfere with one another, the gap between the neighboring insulation panels 200 can be narrowed.

As illustrated in FIG. 6, by installing the supporting piece 113 that crosses the fixing bracket 120 on the fixing plate 110, not only can warpage of the fixing bracket 120 be prevented, but crack in the fastening member 131 or separation of the fixing bracket 120 can be prevented by dispersing the load exerted on the fixing bracket 120.

Figure 7:
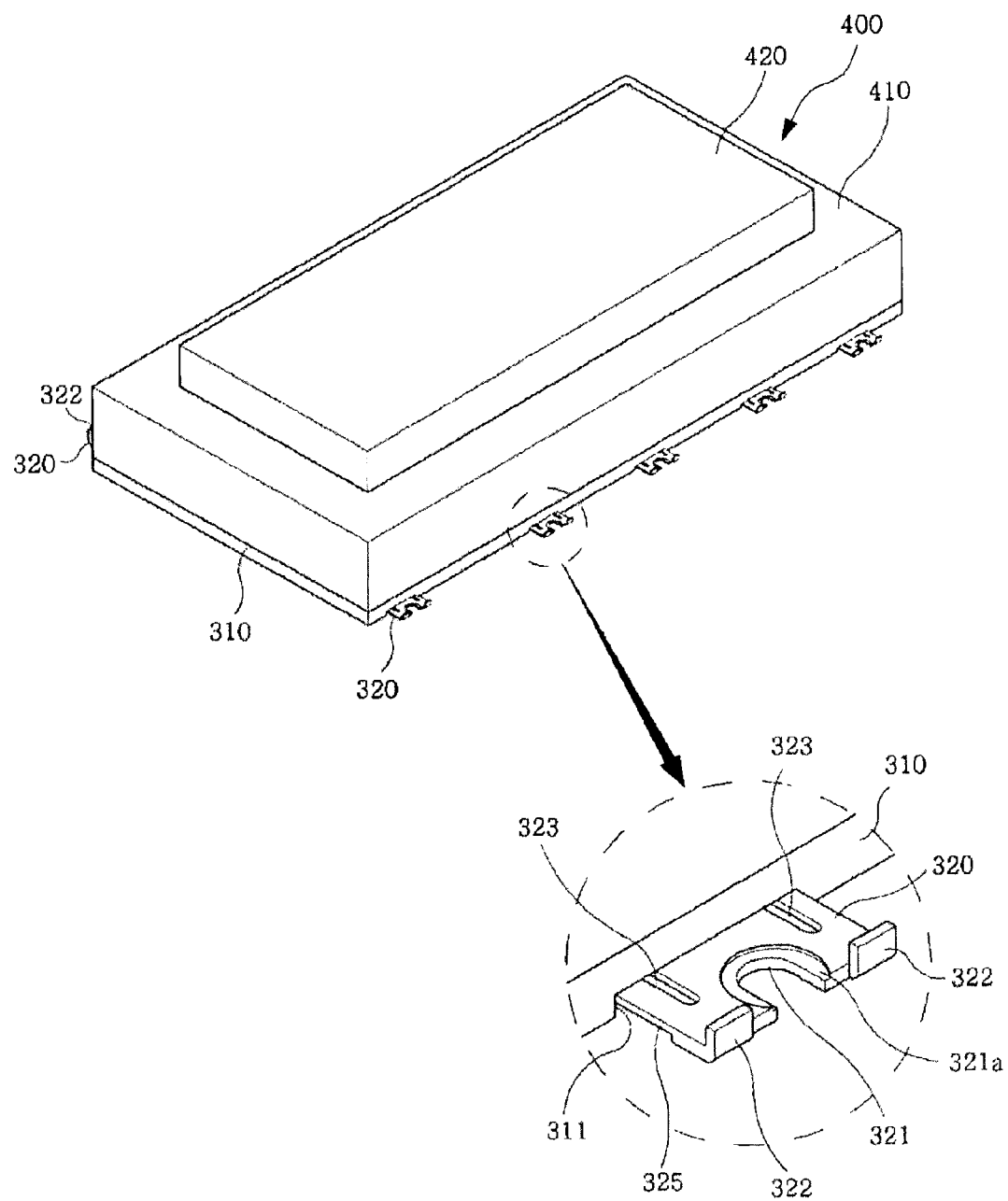
FIG. 7 is a perspective view of a cargo insulation panel in accordance with a second embodiment of the present invention.
Figure 8:
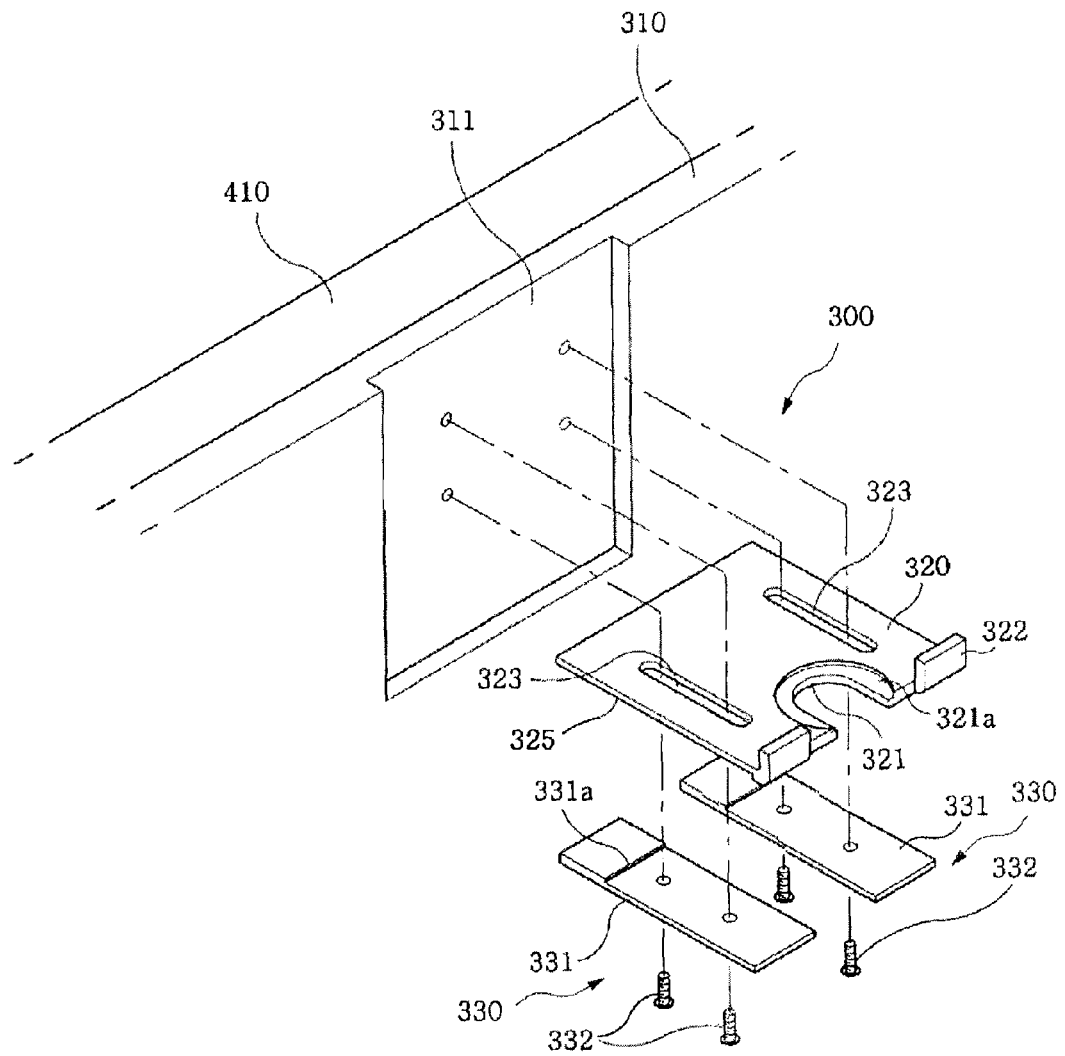
FIG. 8 is an exploded perspective view of a fixing apparatus of the cargo insulation panel in accordance with the second embodiment of the present invention.

FIG. 7 is a perspective view illustrating a cargo insulation panel in accordance with a second embodiment of the present invention, and FIG. 8 is an exploded perspective view illustrating a fixing apparatus of the cargo insulation panel in accordance with the second embodiment of the present invention. As illustrated, a cargo insulation panel 400 in accordance with the second embodiment of the present invention includes, as with the cargo insulation panel 200 in accordance with the first embodiment of the present invention, a bottom insulation panel 410 and a top insulation panel 420, and a fixing apparatus 300 of the cargo insulation panel is arranged on one face of the bottom insulation panel 410.

The cargo insulation panel fixing apparatus 300 in accordance with the present embodiment includes a fixing plate 310, which is adhered to a lower face of the bottom insulation panel 410, a plurality of fixing brackets 320, which are protruded to the outside of the fixing plate 310 so as to be fixed by stud bolts 14 (shown in FIG. 10), and coupling means 330, which couple the fixing brackets 320 to the fixing plate 310.

Used for the fixing plate 310 can be, for example, plywood. The fixing plate 310 is adhered to the lower face of the bottom insulation panel 410 by use of an adhesive such as epoxy glue, reinforces the bottom insulation panel 410, and mediates the bottom insulation panel 410 to be fixed at an internal face of a hull 1 (shown in FIG. 5). The plurality of fixing brackets 320 are arranged along the edges on both sides of the fixing plate 310. The fixing brackets 320 positioned to correspond to one another on two sides are aligned to miss one another so as to narrow a gap between neighboring fixing plates 310. The fixing plate 310 is formed with guide grooves 311 at edges of the lower face so as to guide the fixing brackets 320 to be inserted and reciprocated in and out.

The plurality of fixing brackets 320 are inserted in the guide grooves 311 and supported by coupling means 330 so as to reciprocate between a predetermined position on the inside of the fixing plate 310 and a predetermined position on the outside of the fixing plate 310. The fixing bracket 320 has a stopping part 322, which is formed by, for example, bending at its end portion so that the fixing bracket 320 can be easily withdrawn to the outside by having the fixing bracket 320 to be stopped when the fixing bracket 320 is moved toward the inside of the fixing plate 310. A portion protruded from the fixing plate 310 is formed with a fastening groove 321 so as to be fixed by the stud bolt 14 (shown in FIG. 10).

The fastening groove 321 is formed to have one side open so that the fastening groove 321 can be easily fastened with the stud bolt 14 through the opened portion when the fixing bracket 320 is slid. The fastening groove 321 is also formed with a receiving groove 321a around the opened portion so that the nut 14a (shown in FIG. 10), which is screwed to the stud bolt 14, can be received.

Figure 10:
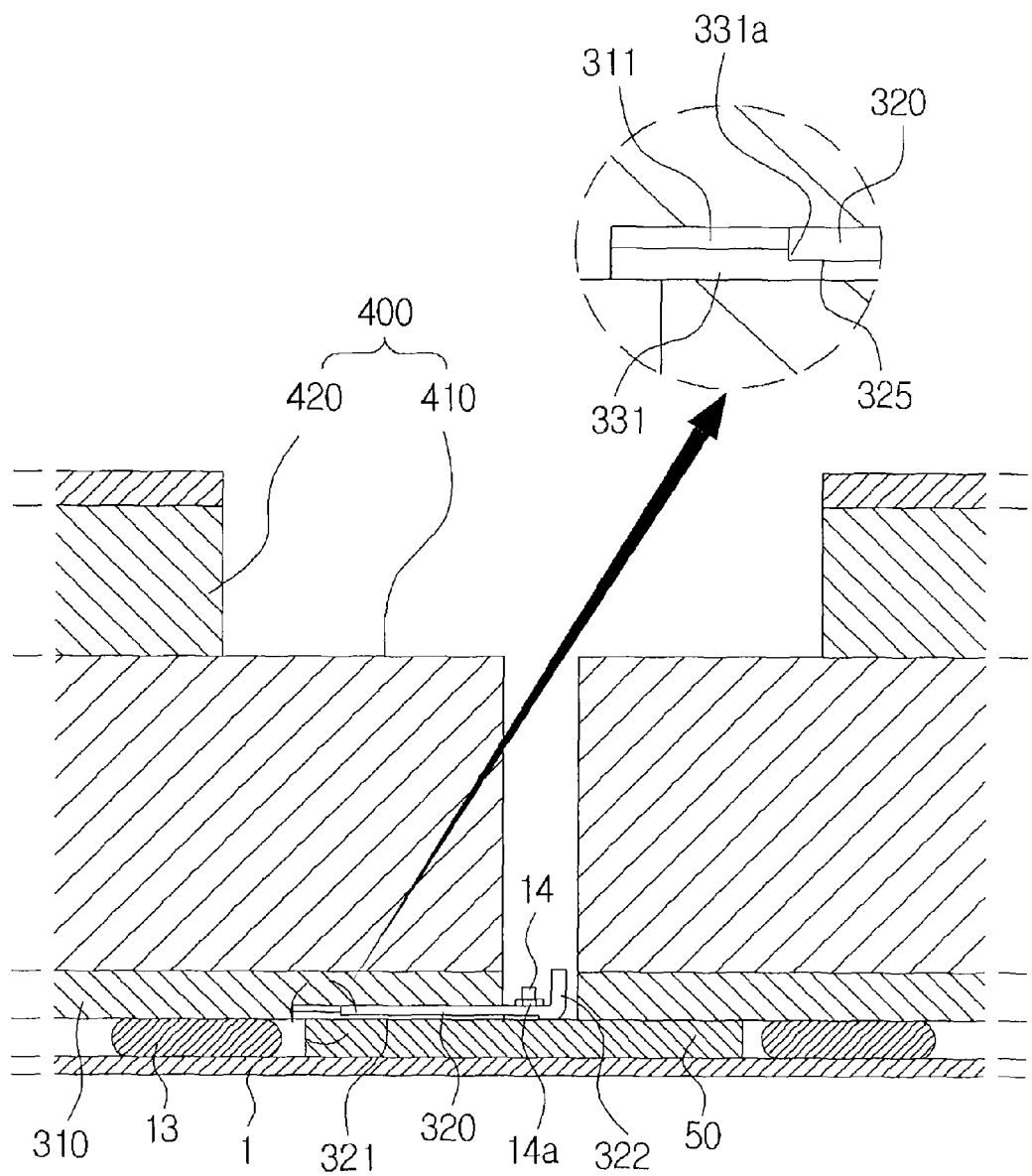
FIG. 10 is a sectional view of the installed cargo insulation panel in accordance with the second embodiment of the present invention.

The coupling means 330 not only supports the fixing bracket 320 to reciprocate in the guide groove 311 but also restricts the fixing bracket 320 to not escape from a position for being fastened with the stud bolt 14 (shown in FIG. 10). In the present embodiment, the coupling means 330 includes supporting plates 331, which support one face of the fixing bracket 320, and fastening members 332, which fixes the supporting plates 331 to the fixing plate 310 with the fixing bracket 320 therebetween.

The supporting plate 331 can be made of metal, high polymer compound, composite materials, etc. and is placed at one exposed face of the fixing bracket 320 that is inserted in the guide groove 311. The supporting plate 331 is also formed with a curb 331a on a side making contact with the fixing bracket 320 in order to stop an end part of the fixing bracket 320 so that the fixing bracket 320 protruded from the fixing plate 310 is not inserted into the fixing plate 310 again.

The fastening members 332 are fastened to the fixing plate 310 by penetrating the supporting plate 331 and passing through guide holes 323 formed in the fixing bracket 320 along its moving direction. The fastening members 323 can include one or more bolts, rivets and pieces.

It is preferable that the coupling means 330 are formed in a pair, as in the present embodiment, so that they can be arranged on either side of the fixing bracket 320. In this way, each of the supporting plates 331 is inserted in an insertion groove 325, which is formed on each of two sides of a lower face of the fixing bracket 320. The insertion groove 325 has a depth that is sufficient to prevent the supporting plate 331 from protruding to the outside of the guide groove 311 and a length that is sufficient to prevent the supporting plate 331 from causing an interference when the fixing bracket 320 reciprocates.

The cargo insulation panel fixing apparatus 300 having the above structure in accordance with the second embodiment of the present invention and the insulation panel 400 using the fixing apparatus function as follows.

Figure 9:
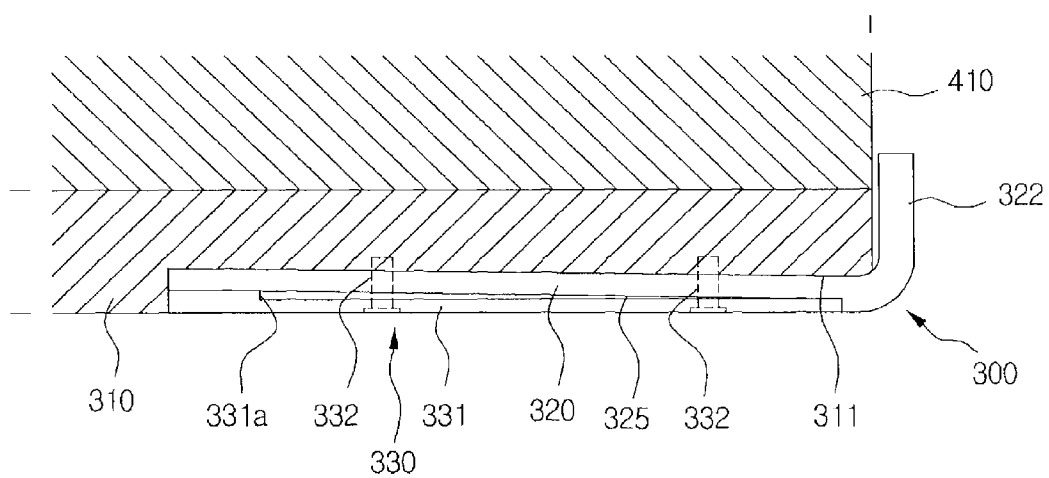
FIG. 9 is a sectional view illustrating a fixing bracket inserted in the cargo insulation panel in accordance with the second embodiment of the present invention.

As illustrated in FIG. 9, the insulation panel 400 is inserted to the inside of the guide groove 311 in order to prevent the fixing bracket 320 from causing interference during the transportation or storage.

When fixing the insulation panel 400 to the hull 1 as illustrated in FIG. 10, the epoxy mastic 13 is coated on the fixing plate 310, and while the fixing bracket 320 is protruded from the fixing plate 310, the stud bolt 14 is inserted into the fastening hole 321 of the fixing bracket 320 to be fastened by the nut 14a. Then, separation of the fixing bracket 320 from the fixing plate 310 is restricted by the supporting plate 331 and the fastening member 332, and insertion of the fixing bracket 320 to the inside of the fixing plate 310 is restricted by the curb 331a. As a result, the fixing plate 310 is fixed to be properly adhered over the epoxy mastic 13 and can be installed over a level pad 50, which is installed on the internal face of the hull 1.

Moreover, like the cargo insulation panel fixing apparatus 100 in accordance with the first embodiment of the present invention, by aligning the fixing brackets 320 that are positioned in between the neighboring fixing plates 310 to miss one another so as not to interfere one another, the gap between the neighboring insulation panels 400 can be narrowed.

Figure 11:
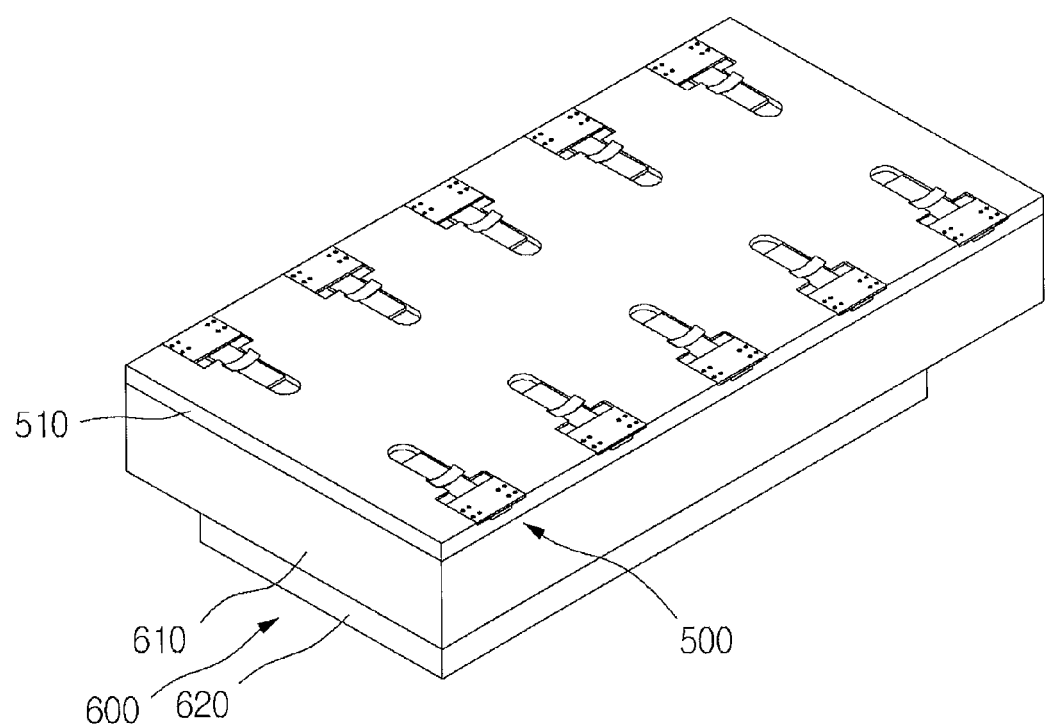
FIG. 11 is a perspective view seen from a lower side of a cargo insulation panel in accordance with a third embodiment of the present invention.
Figure 12:
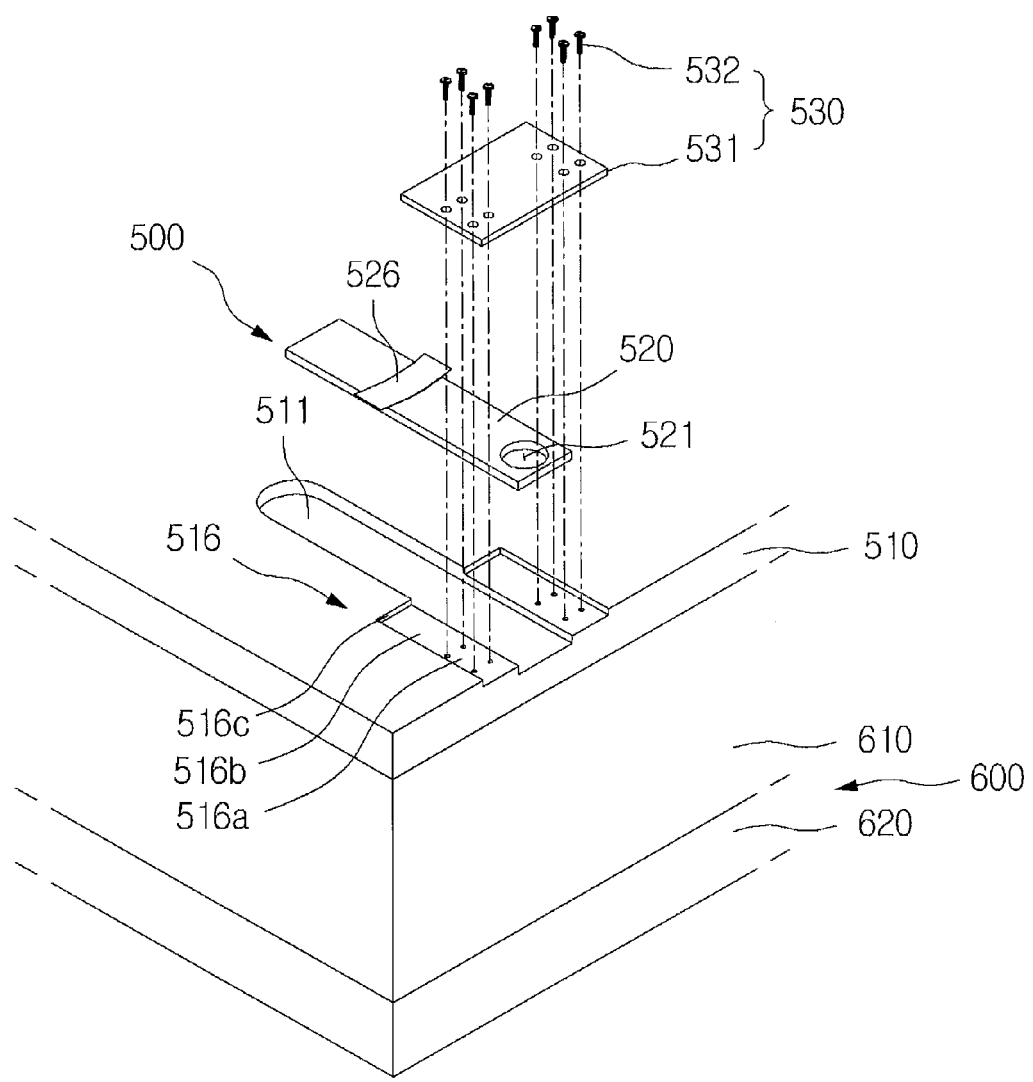
FIG. 12 is an exploded perspective view of a fixing apparatus of the cargo insulation panel in accordance with the third embodiment of the present invention.

FIG. 11 is a perspective view seen from a lower side of a cargo insulation panel in accordance with a third embodiment of the present invention, and FIG. 12 is an exploded perspective view of a fixing apparatus of the cargo insulation panel in accordance with the third embodiment of the present invention. As illustrated, a cargo insulation panel 600 in accordance with the third embodiment of the present invention includes, as with the cargo insulation panel 200 in accordance with the first embodiment of the present invention, a bottom insulation panel 610 and a top insulation panel 620, and a plurality of fixing apparatuses 500 of the cargo insulation panel are arranged along lateral sides of the bottom insulation panel 610.

The cargo insulation panel fixing apparatus 500 in accordance with the present embodiment includes a fixing plate 510, which is adhered to a lower face of the bottom insulation panel 610, a plurality of fixing brackets 520, which are protruded to the outside of the fixing plate 510 so as to be fixed by stud bolts 14 (shown in FIG. 15), and coupling means 530, which couple the fixing brackets 520 to the fixing plate 510. Any redundant description of the fixing plate 510 that was already described with reference to the first and second embodiments will be omitted.

Guide grooves 511 are formed at edges of one face of the fixing plate 510. Inserted in the guide groove 511 is the fixing bracket 520, which is supported to move from the inside to the outside of the fixing plate 510. That is, the fixing bracket 520 can be protruded to the outside of the edges of the fixing plate 510.

Coupled to one face of the fixing bracket 520 by way of, for example, welding is an elastic piece 526, which is made of an elastic metallic material. The elastic piece 526 is coupled in such a way that both ends of the elastic piece 526 are protruded to both sides of the fixing bracket 520. When force is vertically exerted on the other side of the fixing bracket 520, the portions of the elastic piece 526 that are protruded to both sides of the fixing bracket 520 can be elastically deformed according to the direction of the force. Here, as illustrated, the both ends of the elastic piece 526 can be shaped to be curved toward the other side of the guide groove 511. This will be further described later.

A receiving groove 516 is formed on both sides of the guide groove 511, which is formed in the fixing plate 510. The receiving groove 516 is formed to have a shallower depth than the guide groove and to have a length that is a sum of the width of a supporting plate 531 and the width of the elastic piece 526. This will be further described later.

The coupling means 530 include the supporting plate and coupling members 532. A flat planar member can be used for the supporting member 531, and one or more bolts, rivets, pieces, etc. can be used for the coupling members 532. Both ends of the supporting plate 531 are received at a nearby portion 516a of the edge of the fixing plate 510, and the coupling member 532 couples the supporting plate 531 to the fixing plate 510 by penetrating the supporting plate 531 and being fastened to the receiving groove 516. In this way, the fixing bracket 520 is supported in such a way that the fixing bracket 520 can be moved along the guide groove 511 of the fixing plate 510 by the supporting plate 531 but not separated from the supporting plate 531.

A fastening hole 521, which is fastened with the stud bolt 14, is formed at a portion of one end of the fixing bracket 520 that is protruded from the edge of the fixing plate when the fixing bracket 520 is moved from the inside to the outside of the fixing plate 510.

Figure 13:
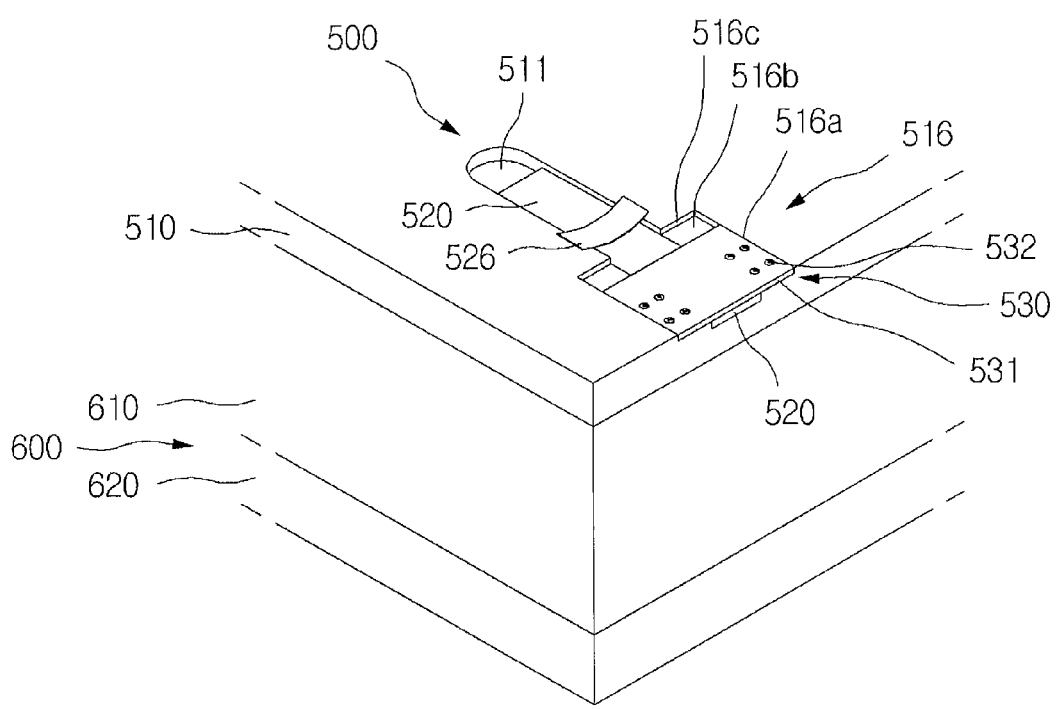
FIGS. 13 and 14 are perspective views illustrating how the fixing apparatus of the cargo insulation panel in accordance with the third embodiment of the present invention works.
Figure 14:
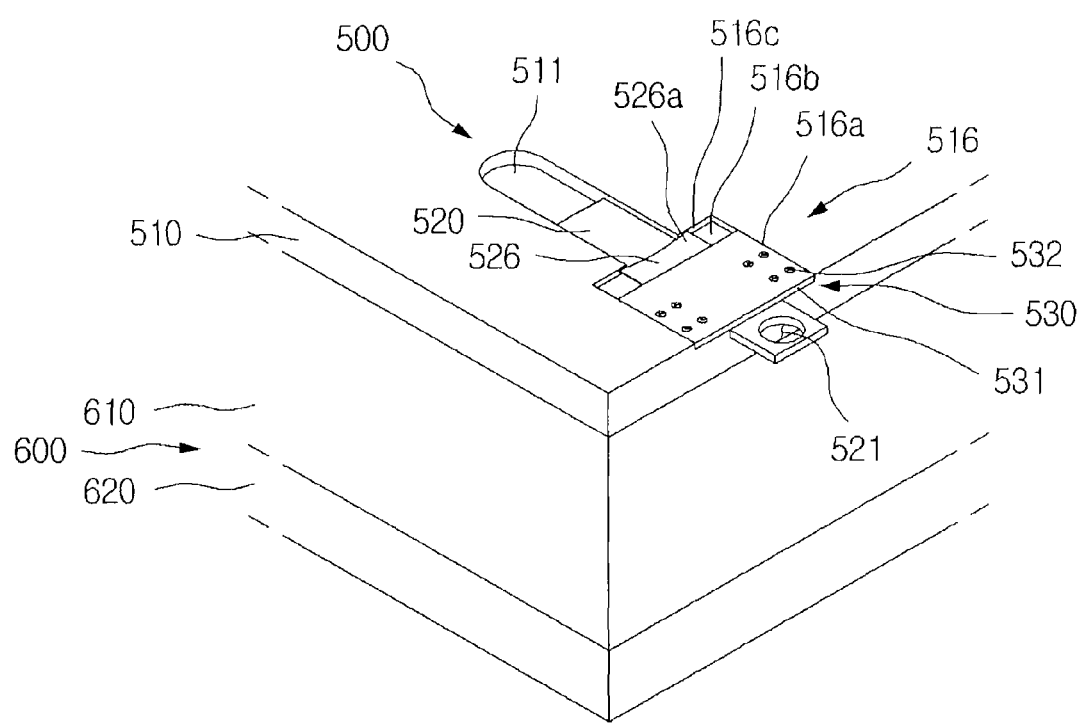

FIGS. 13 and 14 are perspective views illustrating how the fixing apparatus of the cargo insulation panel in accordance with the third embodiment of the present invention works. Referring to FIG. 13, one end of the fixing bracket 520 is inserted in the guide groove 511 without being protruded from the end of the fixing plate 510. Here, as illustrated in FIG. 13, the elastic piece 526 is elastically deformed by both ends of the guide groove 511 in the direction of one face of the fixing bracket 520.

As such, by storing or transporting the insulation panel 600 with one end of the fixing bracket 520 unprotruded from the edge of the fixing plate 510, no interference is occurred by the fixing bracket 520, thereby preventing damage in the insulation panel 600 and facilitating the transportation.

However, unlike the first and second embodiments, the cargo insulation panel fixing apparatus 500 in accordance with the present embodiment stores and transports the insulation panel 600 while one end of the fixing bracket 520 is not protruded in the direction of the edge of the fixing plate 510.

Therefore, when it is desired to protrude the fixing bracket 520 in the direction of the edge of the fixing plate 510, an operator can insert a finger or an appropriate jig into a portion of the guide groove 511 that is located inside the fixing plate 510 and push the other end of the fixing bracket 520 toward the edge of the fixing plate 510 to move the fixing bracket 510.

Therefore, in the perspective of the direction in which the fixing bracket 520 is moved, the length of the guide groove 511 is formed to be longer than that of the fixing bracket 520 so that there is a gap in which the operator can insert a finger or a jig when the fixing bracket 520 is not moved.

Referring to FIG. 14, the fixing bracket 520 is moved inside the guide groove 511, and one end of the fixing bracket 520 is protruded from the edge of the fixing plate 510. Accordingly, the fastening hole 521 formed at one end of the fixing bracket 520 is exposed through the edge of the fixing plate 510.

With the moved fixing bracket 520, the elastic piece 526 coupled to one face of the fixing bracket 520 is also moved toward the edge of the fixing plate 510. Once the fixing bracket 520 is moved to place the fastening hole 521 at a proper position for coupling with the stud bolt 14, the fixing bracket 520 needs to be fixed not to move any more relative to the fixing plate 510.

For this, once the fixing bracket 520 is moved to a predetermined position from the inside to the outside of the fixing plate 510, both ends of the elastic piece 526 that are protruded to both sides of the fixing bracket 520 are inserted into a nearby portion 516b of the receiving groove 516 that is closer to the inside of the fixing plate 510 than the portion 516a in which the supporting plate 531 is received.

In other words, since the length of the receiving groove 516 is formed to be the same as the sum of the width of the supporting plate 531 and the width of the elastic piece 526, the elastic piece 526 is restored to its undeformed state to have both ends of the elastic piece 526 to be inserted in the receiving groove 516b, when the elastic piece 526 is moved along the fixing bracket 520 to the direction of the edge of the fixing plate 510 and both ends of the elastic piece 526 that have been elastically deformed by both sides of the guide groove 511 reach the nearby portion 516b of the receiving groove 516 that is closer to the inside of the filing plate 510.

Once both ends of the elastic piece 526 are inserted into the receiving groove 516b, one side of the elastic piece 526 is in contact with one side of the supporting plate 531, and the other side of the elastic piece 526 is in contact with a curb 516c, which is formed at a portion of the edge of the receiving groove 516 that is near the inside of the fixing plate 510. Accordingly, after the elastic piece 526 is inserted in the receiving groove 516b, the fixing bracket 520 is moved toward neither the inside nor the outside of the fixing plate 510.

Therefore, the elastic piece 526 needs to be coupled to one face of the fixing bracket 520 by considering the position that can make the fixing bracket 520 not move.

In case it is required to transport the insulation panel 600 again, it should be possible to move the fixing bracket 520 to the inside of the fixing plate 510 again, in order to prevent the insulation panel 600 from being damaged by interference of the fixing bracket 520 protruded from the fixing plate 510.

As described above, since the fixing bracket 520 is inserted in the portion 516b of the receiving groove 516 that is near the inside of the fixing plate 510, the fixing bracket 520 does not move to the inside of the fixing plate 510 even if force is exerted on the fixing bracket 520.

Therefore, the fixing bracket 520 can be moved to the inside of the fixing plate 510 along the guide groove 511 if the user uses a finger or a jig to separate a portion 526a having a curved shape formed on both ends of the elastic piece 526 from the receiving groove 516b and exerts force on the fixing bracket 520 toward the inside of the fixing plate 510.

Figure 15:
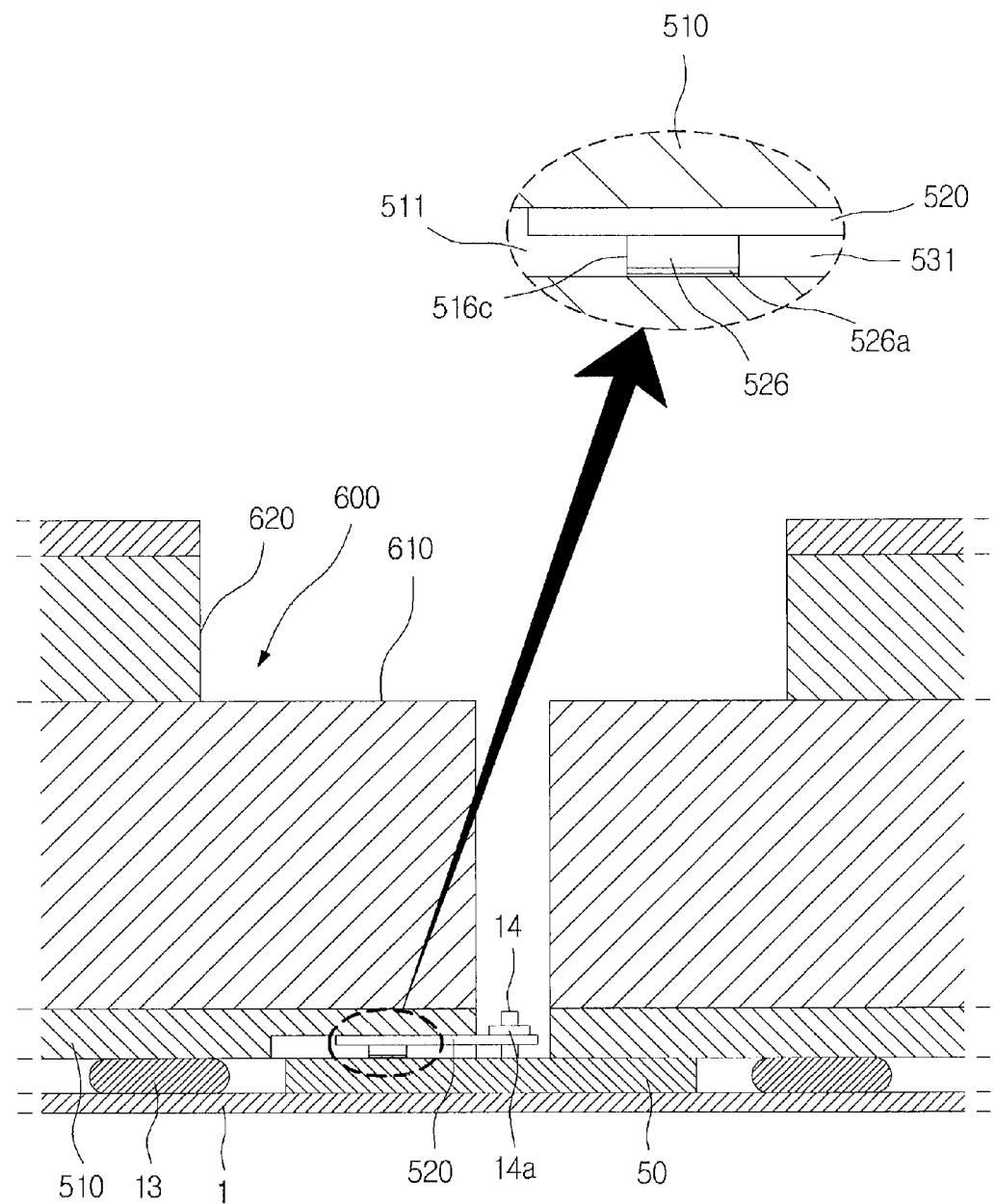
FIG. 15 is a sectional view of the installed cargo insulation panel in accordance with the third embodiment of the present invention.

FIG. 15 is a sectional view of the installed cargo insulation panel in accordance with the third embodiment of the present invention.

When fixing the insulation panel 600 to the hull 1 as illustrated in FIG. 15, the epoxy mastic 13 is coated on the fixing plate 510, and while the fixing bracket 520 is protruded from the fixing plate 510, the stud bolt 14 is inserted into the fastening groove 521 of the fixing bracket 520 to be fastened by the nut 14a.

Here, while separation of the fixing bracket 520 from the fixing plate 510 is restricted by the supporting plate 531 and the fastening member 532, both ends of the elastic piece 526 are caught by one side of the supporting plate 531 and by the curb 526c, and thus movement of the fixing bracket 520 relative to the fixing plate 510 is restricted. As a result, the fixing plate 510 is fixed to be properly adhered over the epoxy mastic 13 and can be installed over a level pad 50, which is installed on the internal face of the hull 1.

Moreover, like the cargo insulation panel fixing apparatus 100 in accordance with the first embodiment of the present invention, by aligning the fixing brackets 520 that are positioned in between the neighboring fixing plates 510 to miss one another so as not to interfere one another, the gap between the neighboring insulation panels 600 can be narrowed.

The receiving groove 516 is formed with a depth that is greater than the thickness of the supporting plate 531 so that the supporting plate 531 is not protruded to the outside of the receiving groove 516, that is, to one face of the fixing plate 510, so as not to have the supporting plate 531 cause interference with the epoxy mastic 13.

FIGS. 16 and 17 are sectional views for illustrating how a modified example of the fixing apparatus of the cargo insulation panel in accordance with the third embodiment of the present invention is applied in a corner insulation panel.

Illustrated in FIGS. 16 and 17 is an insulation panel 800 used for a corner portion of a cargo. The cargo insulation panel 800 is manufactured in accordance with the shape of the corner portion of the hull 1.

In order to fix the cargo insulation panel 800 to the corner portion of the hull 1 as indicated by dotted lines, it is required that fixing brackets 720 are coupled to the stud bolts 14. However, as indicated by solid lines in FIG. 16, when the insulation panel 800 is approached to the corner portion of the hull 1, the stud bolts 14 interfere with the insulation panel 800 due to the shape of the insulation panel 800, making it impossible to couple the fixing brackets 720 to the stud bolts 14.

Therefore, as illustrated in FIG. 17, the fixing bracket 720 on one side of the insulation panel 800 is coupled to the stud bolt 14 first, as indicated by dotted lines, and then the fixing bracket 720 on the other side of the insulation panel 800 is coupled to the stud bolt 14, as indicated by solid lines.

Accordingly, it is required that the fixing brackets 720 of the insulation panel 800 for the corner portion of the cargo can be fixed to the stud bolts 14 at angles tilted by a predetermined range. This will be further described with reference to FIG. 18.

FIG. 18 is an exploded perspective view of a modified example of the fixing apparatus of the cargo insulation panel in accordance with the third embodiment of the present invention.

Referring to FIG. 18, a fixing apparatus 700 of the cargo insulation panel is formed with a fastening groove 721, one side of which is open, at one end of the fixing bracket 720. Therefore, it is possible to couple the stud bolt 14 to the fixing bracket 720 at a tilted angle, and after the insulation panel 800 is coupled as indicated by the dotted lines in FIG. 17, the fixing bracket 720 can be coupled to the stud bolt 14 by use of the nut 14a, which is illustrated in FIG. 15.

Here, while tilting the insulation panel 800 for the corner portion of the cargo toward one side, as illustrated in FIG. 17, to couple the fixing bracket 720 with the stud bolt 14, an end part of the stud bolt 14 can interfere with a fixing plate 710 and a bottom insulation panel 810.

To prevent this, open grooves 704, 734, and 814, shape of which corresponds to the fastening groove 721 formed in the fixing bracket 720, are formed in the fixing plate 710, a supporting plate 731 and the bottom insulation panel 810, respectively. Once the insulation panel 800 is fixed to the hull 1, an insulating material that is the same as the material of the bottom insulation panel 810 is filled in each of the open grooves 701, 734, 814 to prevent the decrease in insulation effect of the insulation panel 800.

When the insulation panel 800 is stored or transported, the fixing bracket can be made to not protrude from the fixing plate 710 so as to prevent the interference by the fixing bracket 720. Then, when the insulation panel 800 is to be fixed to the hull 1, one end of the fixing bracket 720 can be protruded.

Here, the structure and operation of the insulation panel fixing apparatus 700 for protruding the fixing bracket 720 through an edge of the fixing plate 710 are identical to those of the cargo insulation panel fixing apparatus 500 in accordance with the third embodiment of the present invention that has been described with reference to FIG. 12. In other words, the fixing plate 710, a guide groove 711, a receiving groove 716, the fixing bracket 720, an elastic piece 726 and coupling means 730 are identical or very similar to the fixing plate 510, the guide groove 611, the receiving groove 516, the fixing bracket 520, the elastic piece 526 and the coupling means 530, respectively, which have been described with reference to FIG. 12, and thus no redundant description will be provided herein.

For reference, the fixing brackets 120, 320, 520, and 720 used in the insulation panel fixing apparatuses 100, 300, 500, and 700 in accordance with the embodiments of the present invention need to have excellent rigidity, processability and corrosion resistance. Therefore, the fixing brackets 120, 320, 520, and 720 can use a material based on Korean Industrial Standard STS304L or SM45C. In case SM45C is used, a corrosion resistance material can be coated on a surface to prevent corrosion.

According to some embodiments of the present invention as described hitherto, the insulation panel can be fixed to the hull until the epoxy mastic is cured without a through-hole or through-cavity for installing the stud bolt, and thus the continuity of the insulation panel is improved, and adhesiveness with a member such as supple triplex can be enhanced and airtightness can be improved since there is no adhesive gap caused by the through-hole or through-cavity.

Moreover, through the fixing bracket protruded from the fixing plate, adjacent insulation panels can be adjusted vertically or laterally when the insulation panels are assembled on an inner wall of the hull, the surface of which is generally ununiform, and the problem of damage by interference or the inconvenience of transportation can be solved by allowing the fixing bracket to be inserted during the transportation of the insulation panel.

Although some embodiments have been described hitherto, it shall be apparent that the present invention can be readily modified or permutated by a person of ordinary skill in the art to which the present invention pertains, and such modified or permutated embodiments shall be included in the appended claims.

What is claimed is:
1. A fixing apparatus comprising:
a fixing plate adhered to one face of an insulation panel;
a fixing bracket protruded to an outside of the fixing plate, a protruded portion of the fixing bracket being fixed by a stud bolt arranged on a hull;
coupling means being configured to couple the fixing bracket to the fixing plate; and
an elastic piece being coupled to one face of the fixing bracket in such a way that both ends of the elastic piece are protruded through both sides of the fixing bracket,
wherein a guide groove, in which the fixing bracket is inserted and which supports the fixing bracket to reciprocate from an inside to the outside of the fixing plate, is formed at an edge of the fixing plate, wherein a receiving groove, in which both end parts of the elastic piece and the coupling means are received, is formed on either side of the guide groove, wherein the elastic piece is moved toward the edge of the fixing plate when the fixing bracket is moved from the inside to the outside of the fixing plate.

2. The fixing apparatus of claim 1, wherein once the fixing bracket is moved from the inside of the fixing plate to a predetermined position on the outside of the fixing plate, both end parts of the elastic piece are inserted into the receiving groove so that the fixing bracket is moved to neither the inside nor the outside of the fixing plate.

3. The fixing apparatus of claim 2, wherein a fastening groove for fastening the stud bolt to the fixing bracket is formed in the fixing bracket at a portion of the fixing bracket protruded from the fixing plate.

4. The fixing apparatus of claim 3, wherein the coupling means comprises:
- a supporting plate supporting one face of the fixing bracket and being received in the receiving groove; and
- a fastening member being fastened to the receiving groove by penetrating the supporting plate.

5. The fixing apparatus of claim 4, wherein an opening corresponding to the shape of the fastening groove is formed at a portion of the supporting plate, the fixing plate and the insulation panel, respectively.

6. The fixing apparatus of claim 1, wherein a length of the guide groove is greater than a length of the fixing bracket in its reciprocating direction.

\* \* \* \* \*